(12) United States Patent (10) Patent No.: US 9,262,597 B2
Neerumalla et al. (45) Date of Patent: Feb. 16, 2016

(54) VALIDATING NORMALIZED CODE REPRESENTATIONS

(71) Applicant: Microsoft Technology Licensing, LLC, Redmond, WA (US)

(72) Inventors: Bala Neerumalla, Redmond, WA (US); Alain Comeau, Redmond, WA (US); Johann Rehberger, Seattle, WA (US); Graham Calladine, Kirkland, WA (US); Wing Kwong Wan, Redmond, WA (US); George Raymond Derryberry, Jr., Seattle, WA (US); Michael C. Fanning, Redmond, WA (US); David A. Ross, Redmond, WA (US); Mark Cartwright, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 13/842,350

(22) Filed: Mar. 15, 2013

(65) Prior Publication Data

US 2014/0283096 A1 Sep. 18, 2014

(51) Int. Cl.
*G06F 21/10* (2013.01)
*G06F 21/52* (2013.01)
(Continued)

(52) U.S. Cl.
CPC .............. *G06F 21/10* (2013.01); *G06F 21/52* (2013.01); *G06F 21/53* (2013.01); *G06F 21/54* (2013.01); *G06F 2221/033* (2013.01); *G06F 2221/2119* (2013.01)

(58) Field of Classification Search
CPC ....... G06F 21/10; G06F 21/12; G06F 21/121; G06F 21/125; G06F 21/50; G06F 21/52; G06F 21/55; G06F 21/56; G06F 21/563

USPC ........................................................... 726/26
See application file for complete search history.

(56) References Cited

U.S. PATENT DOCUMENTS

2005/0172338 A1 8/2005 Sandu et al.
2005/0203921 A1* 9/2005 Newman et al. .............. 707/100
(Continued)

FOREIGN PATENT DOCUMENTS

EP       1021753 B1    12/2001
WO    2010/062437 A1    6/2010
WO    2014/152079 A1    9/2014

OTHER PUBLICATIONS

Louw, et al., "BLUEPRINT: Robust Prevention of Cross-site Scripting Attacks for Existing Browsers", Retrieved Feb. 9, 2013 at <<http://www.cs.uic.edu/~venkat/research/papers/blueprint-oakland09.pdf>>, in 30th IEEE Symposium on Security and Privacy, May 17, 2009, 16 pages.

(Continued)

*Primary Examiner* — Joseph P Hirl
*Assistant Examiner* — Thomas Gyorfi
(74) *Attorney, Agent, or Firm* — Aneesh Mehta; Kate Drakos; Micky Minhas

(57) ABSTRACT

A request that includes an indication of an execution context and data that represents executable code is obtained. An analysis of the data is initiated based on generating a first templatized representation of the executable code. A list of clearance indicators that indicate a blocking status associated with respective forms of templatized representations is accessed. A workflow policy is determined based on the accessing of the list of clearance indicators. The list of clearance indicators is updated, based on a result of the analysis of the data.

20 Claims, 11 Drawing Sheets

(51) Int. Cl.
*G06F 21/53* (2013.01)
*G06F 21/54* (2013.01)

(56) References Cited

U.S. PATENT DOCUMENTS

| | | |
|---|---|---|
| 2006/0212438 A1 | 9/2006 | Ng |
| 2007/0074169 A1 | 3/2007 | Chess et al. |
| 2009/0187992 A1 | 7/2009 | Poston |
| 2010/0192201 A1* | 7/2010 | Shimoni et al. .................. 726/3 |
| 2011/0197177 A1* | 8/2011 | Mony ............................. 717/115 |
| 2011/0197272 A1 | 8/2011 | Mony |
| 2012/0266244 A1 | 10/2012 | Green et al. |

OTHER PUBLICATIONS

"Validating Input and Interprocess Communication", Retrieved at <<https://developerapple.com/library/mac/#documentation/security/conceptual/SecureCodingGuide/Articles/ValidatingInput.html>>, Retrieved Date: Feb. 9, 2013, 11 pages.

Das, et al., "PRISM: Platform for Remote Sensing using Smartphones", Retrieved Feb. 9, 2013 at <<http://research.microsoft.com/pubs/131575/mobi096-das.pdf>>, in Proceedings of the 8th International Conference on Mobile Systems, Applications, and Services (MobiSys'10), Jun. 15, 2010, 14 pages.

Clarke, Justin, et al., "SQL Injections Attacks and Defenses", Retrieved Feb. 9, 2013 at <<http://adrem.ua.ac.be/sites/adrem.ua.ac.be/files/sqlinjbook.pdf>>, copyright 2009, Syngress Publishing, Inc., 494 pages.

Samuel, et al., "Lets Parse to Prevent Pwnage Invited Position Paper", Retrieved Feb. 11, 2013 at <<https://www.usenix.org/system/files/conference/leet12/samuel.pdf>>, in Proceedings of the 5th USENIX Conference on Large-Scale Exploits and Emergent Threats (LEET'12), Apr. 24, 2012, 4 pages.

"CWE-20: Improper Input Validation", Retrieved at <<http://cwe.mitre.org/data/definitions/20.html>>, Retrieved Date: Feb. 9, 2013, 12 pages.

"International Search Report & Written Opinion for PCT Patent Application No. PCT/US2014/026925", Mailed Date: Jul. 2, 2014, Filed Date: Mar. 14, 2014, 13 Pages.

"PCT Demand for International Preliminary Examination (Chapter II)" for Patent Application No. PCT/US2014/026925, Demand filed Date: Oct. 31, 2014, PCT Filed Date: Mar. 14, 2014, 20 Pages.

"Written Opinion of the International Preliminary Examining Authority" for PCT Patent Application No. PCT/US2014/026925, Mailed Date: Jan. 30, 2015, Filed Date: Mar. 14, 2014, 8 Pages.

\* cited by examiner

VALIDATING NORMALIZED CODE REPRESENTATIONS

BACKGROUND

Many kinds of distributed applications are vulnerable to issues related to the influence of untrusted/user-controlled data on runtime execution. It is common for untrusted data (such as input fields on a web page) to be processed in order to execute database queries or to construct mark-up (and code) which is subsequently rendered and/or executed. Because untrusted inputs may be part of a process involved in the functionality of various applications, and because these inputs may be generally provided as strings and/or other data types which may not be processed/executed directly, application code may integrate/convert them to a form which may subsequently be executed.

SUMMARY

According to one general aspect, a system may include a code validation engine that includes a request acquisition component configured to obtain a request that includes an indication of an execution context and data that represents executable code. A data analysis component may be configured to initiate a first analysis of the data based on generating a first templatized representation of the executable code. A list access component may be configured to access a list of one or more clearance indicators that indicate a blocking status associated with respective forms of templatized representations. A workflow policy component may be configured to determine a first workflow policy based on the accessing of the list of clearance indicators, and a list update component may be configured to initiate a first update to the list of one or more clearance indicators, based on a result of the first analysis of the data.

According to another aspect, a request that includes an indication of an execution context and data that represents executable code may be obtained. A first analysis of the data may be initiated based on generating a first templatized representation of the executable code. Further, a list of one or more clearance indicators that indicate a blocking status associated with respective forms of templatized representations may be accessed. A first workflow policy may be determined based on the accessing of the list of clearance indicators, and a first update to the list of one or more clearance indicators may be initiated, based on a result of the first analysis of the data.

According to another aspect, a computer program product tangibly embodied on a computer-readable storage medium may include executable code that may cause at least one data processing apparatus to obtain a request that includes an indication of an execution context and data that represents executable code. Further, the data processing apparatus may initiate a first analysis of the data based on generating a first templatized representation of the executable code. Further, the data processing apparatus may access a list of one or more clearance indicators that indicate a blocking status associated with respective forms of templatized representations, and determine a first workflow policy based on the accessing of the list of clearance indicators. Further, the data processing apparatus may initiate a first update to the list of one or more clearance indicators, based on a result of the first analysis of the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

I. Introduction

Figure 1:
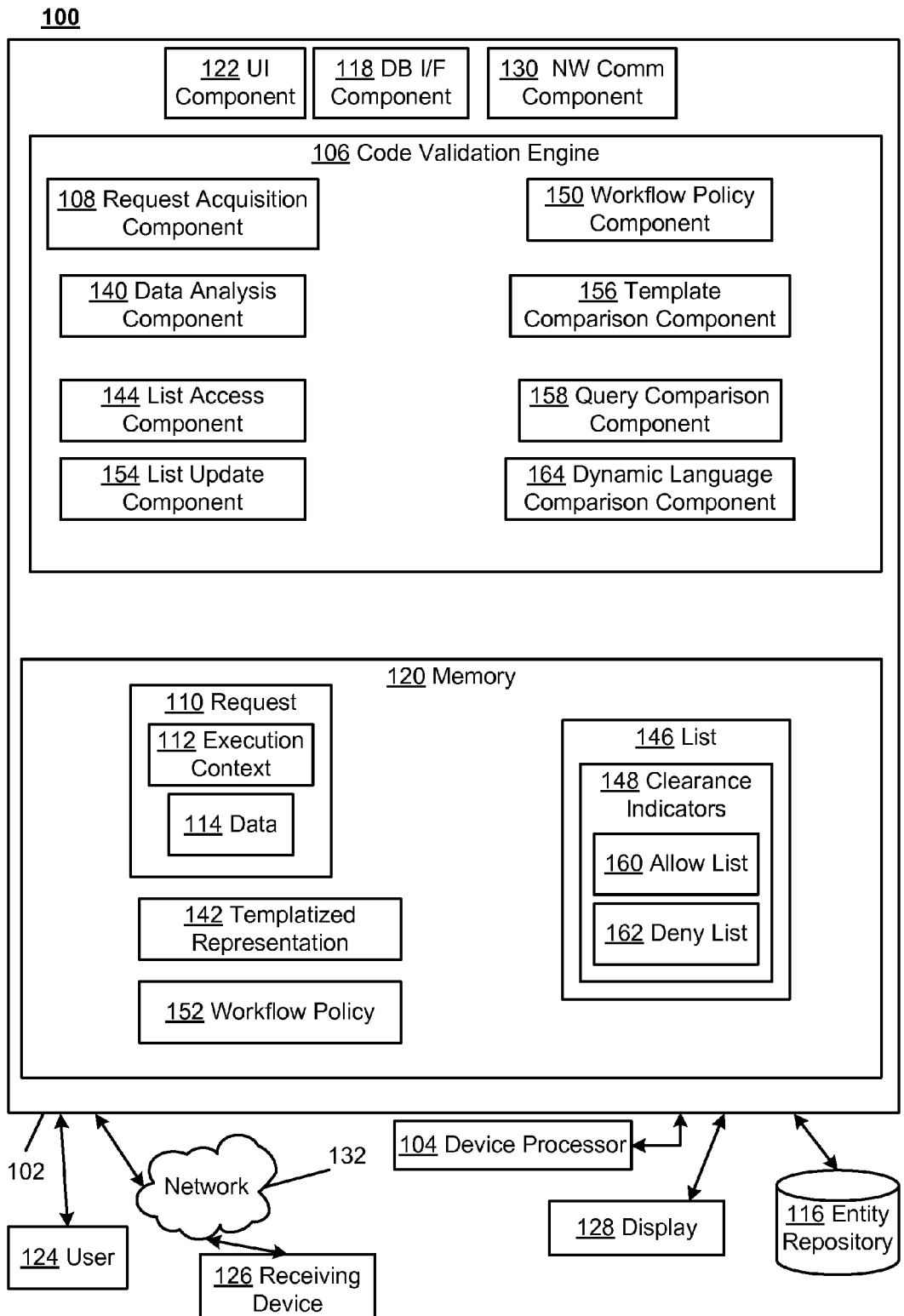
FIG. 1 is a block diagram illustrating of an example system for code validation.

It is possible that various applications such as distributed applications may be vulnerable to issues related to the influence of untrusted/user-controlled data on runtime execution. For example, untrusted data (such as input fields on a web page) may be processed in order to execute database queries or to construct mark-up (and code) which may be subsequently rendered and/or executed. For example, such inputs may be provided as strings and/other data types which may not be processed/executed directly, and thus application code may integrate/convert them to a form which may subsequently be executed. For example, a customer name that is entered on a web page may be integrated into a Structured Query Language (SQL) query that retrieves that customer's order history from a back-end database. Similarly, that customer's name may be integrated into a HyperText Transfer Protocol (HTTP) request made to a server (e.g., as part of a Uniform Resource Locator (URL) query string), which may subsequently result in server-side or client-side processing.

For example, this pattern may also be observed in client-side JAVASCRIPT, where a string representation of code may be constructed which is partly derived from information gathered from arbitrary and untrusted users. For example, this string may then be directly or indirectly converted to code that may be executed by means of a JAVASCRIPT (JS) application programming interface (API) such as 'eval' or by setting Document Object Model (DOM) element properties (such as innerHTML) that may indirectly provoke the instantiation of new DOM elements/mark-up (which may include <iframe> elements that execute code via JAVASCRIPT URLs, as well as embedded JAVASCRIPT that specifies behaviors/event-handlers for visible user interface (UI) elements).

All of these scenarios may involve a common set of attributes: a set of inputs, some of which may be untrusted, are aggregated into a textual representation which itself provides no way of distinguishing trusted from untrusted constituents. For example, a construction of a code buffer may be accomplished through simple concatenation, with no understanding of the language syntax/semantics of the rendered code. As a result, the appearance of line terminating characters, escape sequences, special tokens, and other constructs introduced by untrusted users may alter the syntax/behavior of the code.

Further, many language parsers may support several different encodings for code in text form, which may increase the possible ways in which a code statement may be rendered. For example, after construction, the final textual code representation may be passed to a parsing/compilation/interpreting/processing facility. The API which may be accessed by this dynamically constructed code may be powerful and/or may have access to sensitive information/resources.

There exist solutions that attempt to address this information by being cognizant of untrusted inputs and handling them in specific ways. For example, a set of libraries may "sanitize" untrusted input (e.g., by encoding a string so that it will be interpreted as a string literal, by blocking characters which may be involved in order to be parsed as executable code, etc). However, this approach is only as effective as the discipline with which developers apply sanitization to appropriate input and the quality of the sanitizer itself (which involves being cognizant of all encoding possibilities the runtime may support for rendering executable code, among many other things).

In other cases, a runtime may examine the final constructed version of a text buffer and attempt to determine whether it includes executable code (and is therefore not considered "safe"). For example, this approach again involves a complete understanding of encoding possibilities. It may also be limited in that there may be many scenarios in which a developer may reasonably wish to render executable code (which may be safe) in a textual form. For example, a developer may concatenate a safe "onmouseover" handler to a DOM element. As another approach, an API provider may provide a code construction mechanism which explicitly provides for incorporating inputs/parameters provided by untrusted users. This may be an effective approach but may not be one that is widely available across all dynamic language environments. For example, these solutions may tend to be more costly to implement, and developers may opt for more expedient solutions due to project/time constraints (or because they are not aware of a more secure approach).

Example techniques discussed herein may address these and other problems. In accordance with example techniques discussed herein, a code construction to code execution pipeline may be instrumented at the point where the conversion of text to code occurs (and potentially later when it is executed).

For example, at a first stage, the code may be parsed and normalized to some stable form or "template" (e.g., a form in which an unstable value, such as the current value of an input field in a web form, is replaced by an identifier which may be consistent run-over-run). Prior to execution, the code may be parsed. The appearance of a parsing error at this juncture may indicate a possible attempt by a third party to produce a code buffer that executes arbitrary code, and that observation may be logged or otherwise acted on (e.g., all subsequent processing of the buffer may be halted, or an alert may be issued). For example, after producing the normalized rendering or "template" for the code, this representation may be compared to a list of previously approved/observed representations. If the representation does not appear in the list, the query or code execution may be blocked or some other operation may occur (e.g., an alert may be issued). If, finally, the query or code is executed, that execution may result in a runtime exception or other error of some kind. For example, this occurrence may result in logging, adding the template to the "deny" list, or other action(s).

In accordance with example techniques discussed herein, a self learning algorithm may be used to exploit a vulnerability detection phase of a potential attacker to block further code injection (e.g., SQL injections, embedded script injections, etc.) attacks. For example, learning algorithms discussed herein may be used to detect application behaviors, to determine anomalies, and to build and use lists that indicate a blocking status associated with the anomalies.

Further, example techniques discussed herein may involve an "allow list only" algorithm for systems to utilize, e.g., after using the self learning algorithm (e.g., in self learning mode) for a period of time.

Example techniques discussed herein may be suitable for a range of languages and scenarios that may involve dynamic production of code (e.g., SQL query construction, JAVASCRIPT execution, dynamic construction of markup from text representations, etc.).

For example, it may be observed that a potential attacker may conduct significant experimentation in order to craft a malicious payload that results in some other unintended code execution. For example, these experiments may result in parsing and runtime errors, which may be identified and logged in accordance with example techniques discussed herein. For example, these errors may provide an early warning to application developers, and/or may be used as a basis for blocking execution (e.g., in circumstances where a high security bar is intended to be enforced).

As another example, it may be observed that, due to the economics of monetizing a malicious attack, potential attackers may focus their attention on more popular web sites. Thus, example techniques discussed herein may use the early traffic to an application/web site to seed a set of "approved" templates for its use. For example, after a predetermined period of time, or based on popularity/use metrics, the system may begin to enforce execution based on data collected previously.

Further, example techniques discussed herein may provide an example system that may perform a static analysis against some code, enforce and/or update policy based on results, and then move to a dynamic analysis of the code (e.g., including executing the code), which may also include policy update and/or enforcement. For example, such a system may involve (at least) two phases, including a static analysis phase, and a dynamic analysis phase.

For example, the example techniques may be used in "detection mode" (e.g., alerting users when a "blocked" or "deny" status is determined, as well as "prevention mode" (e.g., potentially "blocking" statements when a "blocked" or "deny" status is determined.

One skilled in the art of data processing will appreciate that there may be many ways to accomplish the analyses for code verification discussed herein, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for validating normalized code representations. As shown in FIG. 1, a system 100 may include a device 102 that includes at least one processor 104. The device 102 may include a code validation engine 106 that may include a request acquisition component 108 that may be configured to obtain a request 110 that includes an indication of an execution context 112 and data 114 that represents executable code. For example, the execution context 112 may include information such as descriptive information for identifying a source of the request 110. For example, the execution context 112 may identify a web application, a particular user, a network address, a JAVASCRIPT source file location, a callstack leading to an execution request, etc. For example, the data 114 may include a SQL query, or an executable script embedded in markup language, etc.

According to an example embodiment, the code validation engine 106, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 104 is depicted as external to the code validation engine 106 in FIG. 1, one skilled in the art of data processing will appreciate that the device processor 104 may be implemented as a single component, and/or as distributed units which may be located internally or externally to the code validation engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the code validation engine 106 may be implemented in association with one or more user devices. For example, the code validation engine 106 may communicate with a server, as discussed further below.

For example, an entity repository 116 may include one or more databases, and may be accessed via a database interface component 118. One skilled in the art of data processing will appreciate that there are many techniques for storing repository information discussed herein, such as various types of database configurations (e.g., relational databases, hierarchical databases, distributed databases) and non-database configurations.

According to an example embodiment, the code validation engine 106 may include a memory 120 that may store the request 110 (e.g., or a representation thereof). In this context, a "memory" may include a single memory device or multiple memory devices configured to store data and/or instructions. Further, the memory 120 may span multiple distributed storage devices.

According to an example embodiment, a user interface component 122 may manage communications between a user 124 and the code validation engine 106. The user 124 may be associated with a receiving device 126 that may be associated with a display 128 and other input/output devices. For example, the display 128 may be configured to communicate with the receiving device 126, via internal device bus communications, or via at least one network connection.

According to example embodiments, the display 128 may be implemented as a flat screen display, a print form of display, a two-dimensional display, a three-dimensional display, a static display, a moving display, sensory displays such as tactile output, audio output, and any other form of output for communicating with a user (e.g., the user 124).

According to an example embodiment, the code validation engine 106 may include a network communication component 130 that may manage network communication between the code validation engine 106 and other entities that may communicate with the code validation engine 106 via at least one network 132. For example, the network 132 may include at least one of the Internet, at least one wireless network, or at least one wired network. For example, the network 132 may include a cellular network, a radio network, or any type of network that may support transmission of data for the code validation engine 106. For example, the network communication component 130 may manage network communications between the code validation engine 106 and the receiving device 126. For example, the network communication component 130 may manage network communication between the user interface component 122 and the receiving device 126.

A data analysis component 140 may be configured to initiate a first analysis of the data 114 based on generating a first templatized representation 142 of the executable code. For example, the first templatized representation 142 may include a stable intermediate representation of the executable code. For example, such "templatized" representations may include abstract patterns that may be associated with the executable code, and that are stable. For example, the code may be "normalized" to eliminate various details (e.g., values of data variables), to provide a resilient structure that may be used to map multiple instances of code to a more generalized representation.

A list access component 144 may be configured to access a list 146 of one or more clearance indicators 148 that indicate a blocking status associated with respective forms of templatized representations 142. For example, the accessing of the list 146 may be based on various aspects of the execution context 112. For example, it may be possible to maintain distinct data sets for specific web applications, which may be determined based on information in the execution context 112. For example, it may be possible to initiate a blocking of requests altogether based on the execution context 112 (e.g., if there are an unacceptable number of problems observed that are associated with an Internet Protocol (IP) address sending requests, etc.).

For example, the execution context 112 may be referred to, or otherwise substantially relevant to any accessing or updating of the list 146 of one or more clearance indicators 148.

A workflow policy component 150 may be configured to determine a first workflow policy 152 based on the accessing of the list 146 of clearance indicators 148. For example, a workflow policy may include an indication associated with logging one or more of a result, anomaly, potential exploit, etc., to a persistent store for subsequent evaluation. For example, a workflow policy may include an indication associated with presenting a message or visual indicator to a user (e.g., on a current machine or remote device).

For example, a workflow policy may include an indication associated with presenting a blocking message to a user requesting a decision regarding workflow policy (e.g., subsequently enforced). For example, a workflow policy may include an indication associated with halting processing of the request (e.g., error messages may or may not be returned).

For example, current workflow policies may be adjusted/modified at any time, e.g., manually, by system administrators, or as part of the system's operation (e.g., if excessive requests flagging problems are observed, workflow policy may be adjusted to stop processing requests altogether).

A list update component 154 may be configured to initiate a first update to the list 146 of one or more clearance indicators 148, based on a result of the first analysis of the data 114. For example, it may be possible to update the list 146 based on information received in the execution context 112. For example, it may be possible to update the list to indicate a blocked status associated with an observation that there are an unacceptable number of problems observed that are associated with an IP address sending requests.

For example, an update to the list 146 of one or more clearance indicators 148 may be initiated, based on a self learning algorithm that is based on detecting one or more parsing errors in the obtained request 110.

In accordance with example techniques discussed herein, the system 100 may operate in self learning mode (as well as other modes), at least for a predetermined period of time (or indefinitely). For example, the system 100 may learn the legitimate and malicious queries over a period of time without any initial effort from other sources such as web developers, system administrators, or others.

Figure 2:
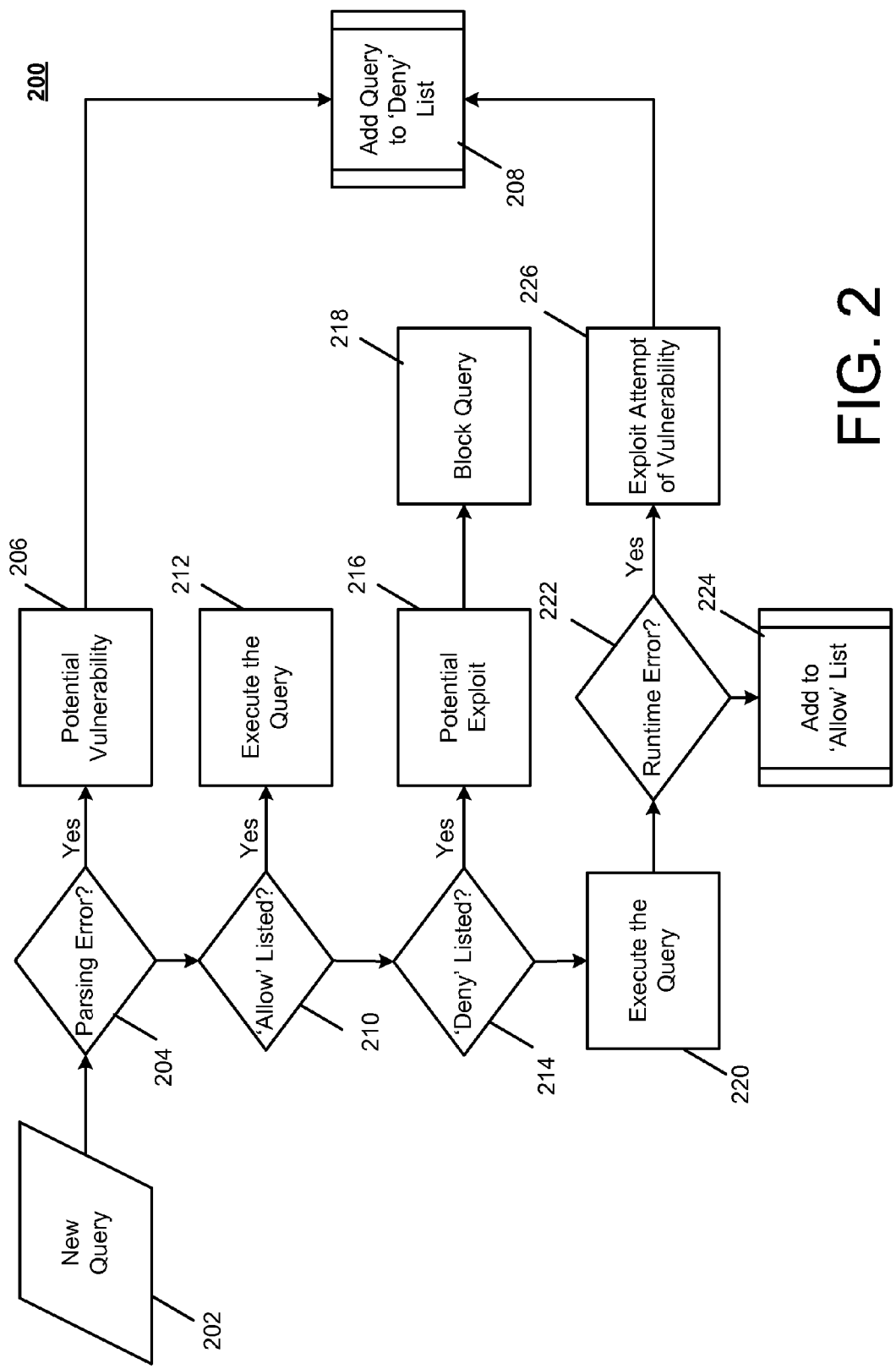
FIG. 2 is a flowchart illustrating operations of an example self learning technique.

FIG. 2 is a flowchart illustrating operations of an example self learning technique 200. In an example scenario, when a web application submits a request 110 (e.g., a request 110 that includes a SQL query, submitted to SQL SERVER), as shown in step 202 of FIG. 2, the request 110 may be processed (e.g., SQL SERVER may parse the query that is included in the request 110). In this example scenario, if there are any parsing errors (step 204), the system 100 may treat that event as a potential SQL injection vulnerability in the web application (step 206), and may convert the query into a canonical form, and add (step 208) it to the list 146 of one or more clearance indicators 148 that indicate a blocking status associated with respective forms of templatized representations 142 (e.g., all or a portion of the list 146 may include representations associated with a "deny list" of invalid query templates, as discussed further below with regard to a deny list 162).

For example, a detection or observation of parsing parsing errors, inline comments, or multi-statement batches (or other observations) may be determined as potential SQL Injection attempts.

For example, if the query parses correctly (step 204), the canonical form of the query may be compared with an "allow list" of query templates (step 210). For example, the list 146 may initially be empty and may be built over a period of time. For example, if the query matches an entry in the "allow list" of template queries, then, e.g., the system 100 may execute the query (step 212).

For example, if the query fails matching entries in the "allow list" (step 210), then the query may be compared (step 214) against a "deny list" of template queries (e.g., a deny list 162, as discussed below). If the query matches an entry in the "deny list," then the system 100 may treat the query as a potential exploit of a previously discovered vulnerability (step 216), and may block the query (step 218).

For example, if the query does not match entries in either the "allow list" or "deny list," the query may be executed (step 220), and an analysis may be initiated to determine whether there are any runtime errors during execution (step 222).

For example, if it is determined that there are runtime errors, then the statement may be treated as a potential injection attack (e.g., a potential SQL injection attack), and the user may be alerted to a potential vulnerability in the web application.

For example, if the query returns no runtime errors, then it may be added (step 224) to the "allow list" (e.g., as an update to the list 146).

For example, in addition to checking runtime errors, the system 100 may check whether the new statement may be evaluated as a potential exploitation of an already existing "allow listed" query template (step 226), before adding a new statement to the "allow list." For example the system 100 may determine that the statement will avoid blocking (i.e., the statement will not be blocked), and the system 100 may alert users about a potential vulnerability and a successful exploit.

For example, such an additional check may be performed as shown in the example below.

An example legitimate query may be represented as:

$$\text{DELETE FROM USERS WHERE PASSWORD='!)} \\ \text{*}LKLAa8\text{' AND USER\_NAME='admin'} \quad (1)$$

For example, the system 100 may construct a corresponding query template as:

$$\text{DELETE FROM USERS WHERE} \\ \text{PASSWORD=@param0 AND} \\ \text{USER\_NAME=@param1} \quad (2)$$

For example, if there is a SQL injection vulnerability through the "password" field, a potential attacker may use a password such as 'dummy' OR "=" in his first attempt. The statement may result in deleting all users from the table, and may be represented as:

$$\text{DELETE FROM USERS WHERE} \\ \text{PASSWORD='dummy' OR ``=" AND} \\ \text{USER\_NAME='admin'} \quad (3)$$

In this example, the system 100 may construct a query template that may be represented as:

$$\text{DELETE FROM USERS WHERE} \\ \text{PASSWORD=@param0 OR} \\ \text{@param1=@param2 AND} \\ \text{USER\_NAME=@param3} \quad (4)$$

For example, the expression "OR @param1=@param2" in the query template shown above, may be determined as a constant expression that does not depend on any of the columns. The system 100 may thus treat this example scenario as a potential exploit and may warn the users. For example, system administrators may review the generated template and add it to the "allow list," or may initiate an analysis of the web application code to determine a potential root cause of the problem.

For example, a template comparison component 156 may be configured to initiate a comparison of the first templatized representation 142 of the executable code with one or more entries in the list 146 of clearance indicators 148.

For example, the data analysis component 140 may be configured to determine the first templatized representation 142 of the executable code based on parsing a Structured Query Language (SQL) query included in the request 110, and determining a first templatized representation of the SQL query, based on the parsing of the SQL query.

For example, a query comparison component 158 may be configured to initiate a comparison of the first templatized representation of the SQL query with one or more entries in the list 146 of one or more clearance indicators 148.

For example, the list 146 of clearance indicators 148 may include one or more of an allow list 160 of clearance indicators 148 that indicate a non-blocked status associated with at least a first portion of the respective forms of templatized representations 142, or a deny list 162 of clearance indicators 148 that indicate a blocked status associated with at least a second portion of the respective forms of templatized representations 142. For example, such an allow list 160 may include one or more lists that may each be referred to as an "allow list." For example, such a deny list 162 may include one or more lists that may each be referred to as a "deny list."

In accordance with example techniques discussed herein, the system 100 may operate in "allow list only" mode. For example, a web developer may submit the "allow list" of query templates that are used by a particular web application, and any statements that are submitted from the web application that do not match the "allow list" (e.g., the allow list 160) may be blocked.

Figure 3:
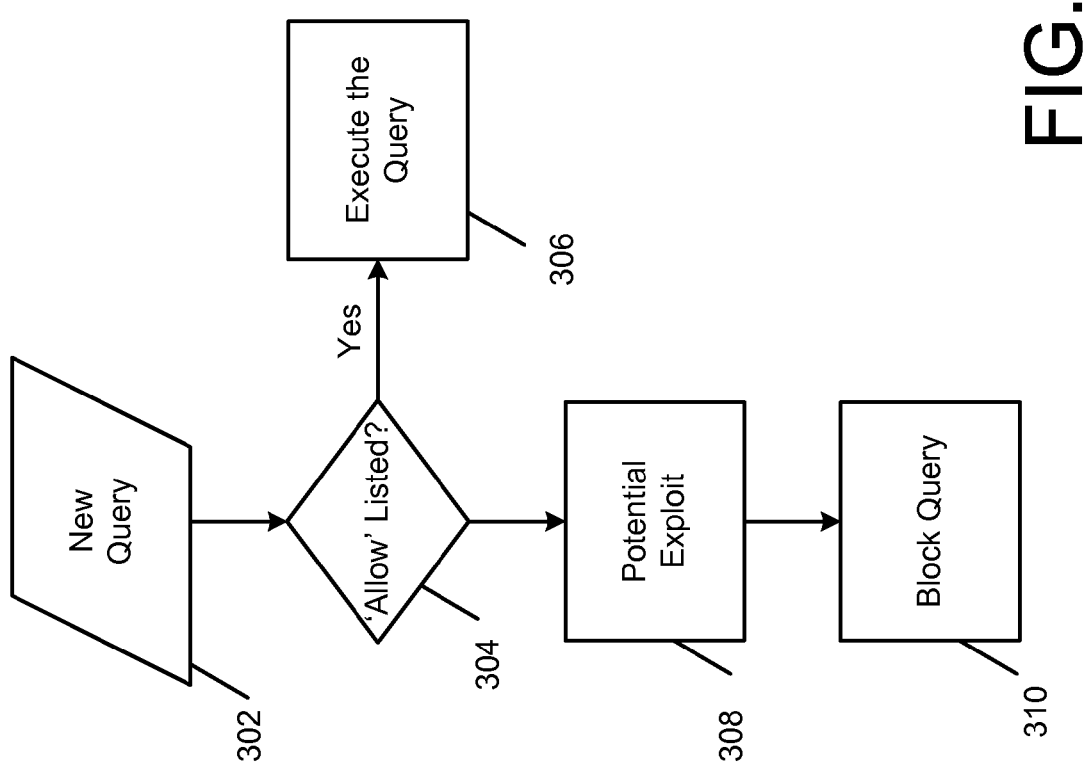
FIG. 3 is a flowchart illustrating operations of an example allow list technique.

FIG. 3 is a flowchart illustrating operations of an example allow list technique 300. For example, when a web application submits a query to the system 100 (e.g., in a request 110), the system 100 may parse the query (step 302). If there are any parsing errors, the system 100 may treat the query as a potential code injection (e.g., SQL injection) vulnerability in the web application and alert a system administrator to review and potentially repair the vulnerability. If the query parses correctly, the system 100 may compare (step 304) a canonical form of the query against the list of preapproved query templates (e.g., the "allow list"). If the query matches an entry in the "allow list" of template queries then the system 100 may execute the query (step 306). If the query fails matching entries in the "allow list," then the system 100 may treat the query as a potential exploit attempt (step 308), and may block the query (step 310).

For example, the query comparison component 158 may be configured to initiate the comparison of the first templatized representation of the SQL query with one or more entries in the list 146 of clearance indicators 148 based on one or more of initiating a structural comparison of the first templatized representation of the SQL query with one or more entries in the allow list of clearance indicators, or initiating a structural comparison of the first templatized representation of the SQL query with one or more entries in the deny list of clearance indicators.

For example, the query comparison component 158 may be configured to initiate the comparison of the first templatized representation of the SQL query with one or more entries in the list 146 of clearance indicators 148 based on initiating a binary string format comparison of the first templatized representation of the SQL query with one or more entries in the allow list 160 of clearance indicators 148. For example, the query comparison component 158 may be configured to initiate the comparison of the first templatized representation of the SQL query with one or more entries in the list 146 of clearance indicators 148 based on initiating a token-by-token comparison of the first templatized representation of the SQL query with one or more entries in the deny list 162 of clearance indicators 148.

In accordance with example techniques discussed herein, the system 100 (e.g., via the data analysis component 140) may parameterize a successfully parsed query, and may perform a binary string comparison against query templates present in the "allow list" (e.g., comparing against the allow list 160 entries, via the query comparison component 158). If there is a match, then the statement may be successfully executed. For example, the comparison may further include any type of "string comparison," or other type of comparison to check for equality (or substantial equality. One skilled in the art of data processing will understand that there are many other types of "equality" comparisons that may be used, without departing from the spirit of the discussion herein.

In another aspect, and in accordance with example techniques discussed herein, the system 100 (e.g., via the data analysis component 140) may parameterize the incoming query and may compare the parameterized query with the query templates in the "deny list" (e.g., comparing against the deny list 162 entries, via the query comparison component 158). Deny list comparison may involve comparing the query structure of the parameterized queries by comparing token by token. For example, if the tokens match up to a user controllable parameter and if there is a mismatch after that, then the system 100 may infer that the new query matches the "deny listed" query. For example, the system 100 may assume that every parameter poses an injection opportunity, and if there is a successful match until the parameter, and there is a mismatch after the parameter, then the system 100 may treat the query as an injection attempt.

For example, various types of optimizations may be performed to substantially remove "false positives" for comparisons such as those discussed above.

In accordance with example techniques discussed herein, there may exist one or more exceptions, for example, an exception for integer parameters. For example, since an attacker may supply anything instead of an integer, the mismatch may occur at the integer parameter token itself, and in such case the system 100 may treat that example occurrence as an injection attempt as well.

As an example scenario, an attacker may generate a query that may be represented as:

DELETE FROM USERS WHERE PASSWORD=' '
    AND USER_NAME='admin'    (5)

For example, the system 100 (e.g., via the data analysis component 140) may generate a corresponding query template as (e.g., if there is not a matching "allow list" entry, in the allow list 160):

DELETE FROM USERS WHERE
    PASSWORD=@param0 admin@param1    (6)

For example, if there is a corresponding "allow list" entry (e.g., in the allow list 160) such as:

DELETE FROM USERS WHERE
    PASSWORD=@param0 AND
    USER_NAME=@param1    (7)

then the system 100 may add this entry into the "deny list" (e.g., into the deny list 162).

For example, if a potential attacker attempts to exploit this vulnerability by supplying a password value of 'OR 1=1— then the query may be represented as:

DELETE FROM USERS WHERE PASSWORD='
    'OR 1=1—'AND USER_NAME='admin'    (8)

For example, the system 100 (e.g., via the data analysis component 140) may convert this statement to a canonical form as:

DELETE FROM USERS WHERE
    PASSWORD=@param0 OR
    @param1=@param2—@param3admin@param4    (9)

For example, since there may not be any "allow listed" query template that exactly resembles this query template, the system 100 may check against a "deny listed" query such as:

DELETE FROM USERS WHERE
    PASSWORD=@param0 AND
    USER_NAME=@param1    (10)

Since the two canonicalized queries as shown above match until @param0 and there is a mismatch at OR, the system 100 may interpret this event as representative of an exploit attempt, and may block the statement.

In accordance with example techniques discussed herein, entries may be fed into both the "allow list" (e.g., the allow list 160) and the "deny list" (e.g., the deny list 162), in lieu of the system 100 continuously self-learning them. For example, such a "virtual patching" capability may provide a means for end users to block vulnerable code paths while avoiding a wait for a vendor to issue a code patch. A system administrator may review collected lists of potential exploits/valid execution requests in order to update, correct, or disambiguate unresolved entries.

For example, the data analysis component 140 may be configured to determine the first templatized representation 142 of the executable code based on parsing dynamic language code that is embedded in a web page, and determining a templatized form of the embedded dynamic language code, based on the parsing of the embedded dynamic language code.

For example, a dynamic language comparison component 164 may be configured to initiate a comparison of the templatized form of the embedded dynamic language code with one or more entries in the list 146 of one or more clearance indicators 148.

For example, the dynamic language code may include one or more of script code, or script code that is embedded within a web page that includes markup language.

In accordance with example techniques discussed herein, the request 110 may include a request 110 that is associated with web programming techniques. As an example, a parameterized URL may be represented as:

http://mysubdomain.contoso.com/
    default.aspx?name=MyName&class=welcome    (11)

After server-side processing, the parameterized URL shown above may produce:

```
<html><body><div onmouseover='handleMouseOver( )'
class='welcome'>Hello
MyName</div></body></html>                              (12)
```

As shown above, details of the code example have been elided (e.g., the inclusion of relevant Cascading Style Sheets (CSS) files to style the page). However, as shown, an untrusted 'class' parameter (e.g., untrusted because any user may be able to provide this information in a URL entered into a browser, as well as being able to handcraft a link with a backing URL that a second party may be convinced to click) is used to construct the 'class' attribute on the emitted "div" element (e.g., this class name may be used to provoke CSS-based styling in an actual page).

For example, the second representation above includes sufficient elements in place to "execute" the code. In accordance with example techniques discussed herein, before attempting to render the page that includes the representation (which may include an outcome of executing JAVASCRIPT), the code may be reduced to a stable representation that is insensitive to expected changes provoked by providing differing values for the 'name' and 'class' variables, thus resulting in a simple structural representation of the page. For example, an indeterminate number of user requests may reduce to the following representation:

```
<html><body><div onmouseover=JS/></body></
    html>(13)
```

For example, this code representation reduces the HyperText Markup Language (HTML) to be rendered to a mostly structural view that provides a marker for observed executable code (in this case, it is noted that the <div> element contains executable JavaScript code associated with the onmouseover event/attribute, signified by 'JS').

As another example, an attacker may attempt to determine whether the server-side processing is failing to sanitize inputs properly in a way that the attacker can leverage. For example, the potentially malicious party may craft a URL such as:

http://mysubdomain.contoso.com/default.aspx?name=    (14)
    MyName&class= welcome' focus='doSomething( )

This example is not intended to be a functional attack, as it is simplified for readability. For example, this specific code may provoke syntactic errors in the emitted page (which may also be used as an indicator of a problem, as described herein).

However, this example attack, given a hypothetical insecure server-side implementation, may emit the following web page that, when rendered, may execute a function named 'doSomething( )' (e.g., which may include malicious functionality) when the 'focus' event associated with the page <div> element is fired:

```
< html><body><div onmouseover='handleMouseOver( )' class    (15)
    'welcome' focus='doSomething( )'>
    Hello MyName</div></body></html>
```

For example, a stable version of this code may be generated as:

```
<html><body><div onmouseover=JS
    focus=JS><script></div></body></html>               (16)
```

For example, the above representation is substantially different from the previous version, and indicates that a potential attacker may have succeeded in creating a page representation that is likely to be regarded as unacceptable in regular use.

Assuming the same example site as above, another potentially maliciously constructed URL may be represented as:

http://mysubdomain.contoso.com/default.aspx?name=MyName</div>
    <script>doSomething( )<script><div>    (17)

This example may be rendered by a server to produce example mark-up represented as:

```
<html><body><div onmouseover='handleMouseOver( )' class
    'welcome'>Hello MyName</div><script>
    doSomething( )</script><div></div></body></html>        (18)
```

In this example, the attacker has successfully injected a <script> element containing a call to arbitrary code by providing a 'name' query string parameter that closes off the active <div> element and appends a <script> element containing a call to a function doSomething( ) (one skilled in the art of data processing will understand that code details may be elided for brevity). A sequence of characters to open a new <div> element are provided in order to ensure that the finally emitted code is syntactically correct. For example, before achieving this syntactically correct condition, an attacker may be likely to have produced one or more experimental attempts that resulted in a page that is broken, not well-formed, or otherwise syntactically incorrect. The reduced representation of this attack may appear as:

```
<html><body><div onmouseover=JS'>Hello MyName</div>        (19)
    <script/><div/></body></html>
```

Again, this representation is substantively different from what has been observed in prior execution and includes an indicator (in this case an unexpected <script> element) that this previously unobserved and potentially malicious request intends to execute code.

In accordance with example techniques discussed herein, the receipt of the execution request, the transformation to a stable representation, and other functionality may exist in several locations. For example, such functionality may be executed within a browser on a client, or may reside on a web server. For example, the processing for compute an execution context may vary for each scenario, as appropriate.

The example scenario above may be recreated for other code execution scenarios. For example, a code snippet may be illustrated as shown in Algorithm 1:

Algorithm 1
Code Snippet #1

```
1 function handler( ) {
2        if (xhr.readyState == 4 /* complete */) {
3            if (xhr.status = 200) {
4                document.body.innerHTML(xhr.responseText);
5            }
6        }
7 }
8 var xhr = new XMLHttpRequest( );
9 xhr.open("GET", "http://contoso/mypage", true);
10 xhr.onreadystatechange = handler;
11 xhr.send( );
```

As shown in the code snippet of Algorithm 1, XMLHttpRequest is initiated to a URL. When the data is received, it is applied to the body of the current document. For example, this may have the effect of potentially converting data into executable code and running it (e.g., if the response text includes JAVASCRIPT). This code example affords (at least) two opportunities for instrumentation in accordance with example techniques discussed herein. For example, the response itself may be processed in order to determine a stable set of code representations that have been observed previously, explicitly added to an execution approved list, etc. These responses may be organized around the specific URL used to retrieve the data (that is, the URL is a component of the execution context for this example). Additionally, the call to the 'innerHTML' setter may be instrumented (which may entail processing the response text, as this is the argument provided to that API). In this case, the specific file/line location for this call or a specific call stack leading up to the API call may be used to retrieve/organize/produce workflow decisions. The URL may still be an execution context component for this scenario as well.

For example, these example techniques may be applied to JAVASCRIPT APIs that directly convert textual source representations into running code. For example, these may include the eval function, the Function(code) constructor, execScript, the setTimeout and setInternal overloads that accept code as a test argument, and others. For these cases, an alternate approach for creating a stable, structural representation of the code may be used. For example, the code may be converted to an abstract syntax tree (in which many more aspects/details of code may be abstracted away than may be typical for a program abstract syntax tree (AST)). For example, a code snippet may be illustrated as shown in Algorithm 2:

Algorithm 2
Code Snippet #2

```
1 function convert_To_JSON_And_Process_Result(input) {
2       var jsonObject = eval("(" + input + ")");
3       if(xhr.status == 200) {
4           processJSONObject(jsonObject);
5 };
```

As shown in Algorithm 2, some input is passed to a helper that encapsulates the data with parentheses and passes the result to the eval function. If the input argument includes a data expression in the JSON format (e.g., '{a: 1, b: 2}'), the call to eval will convert this code to a JAVASCRIPT object that may be directly accessed.

An AST of this code that may be produced for a static analysis purpose may be represented as:

```
{"type": "Unit", "body":[{"type": "ObjectExpression",
"members":[{"type":
"MemberOperator", "target":{"type": "StringLiteral", "value": "a"},
"member":{"type": "NumberLiteral", "value": 1}},{"type":
"MemberOperator", "target":{"type": "StringLiteral", "value": "b"},
"member":{"type": "NumberLiteral", "value": 2}}]}]}        (20)
```

Various aspects of the code, including construct offsets, parentheses, white space details, etc., have already been abstracted away in the representation shown above. As an expression, however, this representation still includes many details that may be sensitive to change in run-over-run code executions that are expected and have not been tampered with. This includes details such as the current values of string and numeric literals. For example, a data object such as the above may include an arbitrary number of members or elements, and it may be useful to abstract this information away as well. In another (simplified) example representation, this code may be reduced to a construct, which may be represented as:

[ObjectExpression(NumberLiteral)]        (21)

For example, this representation may describe the type or kind of JAVASCRIPT code construct encountered, which has been further processed to include information on the node types for all encapsulated members (which in this example reduces to a single type, as all member values are numeric literals).

In another scenario, an attacker may have become aware of the call to eval in the above code, and may have contrived a technique for tampering with the data that is passed to it. For example, a potential attacker may provide an input such as:

function( ){doSomething( );return {a:1};})(; (22)

The example code shown above may compile and execute without error when passed to eval. For this example, the attack has been constructed to depend on prefixing and suffixing of parentheses before the text is passed to the function. On execution, a function expression is invoked, with the result that the body of the function is executed. This in turn executes a function named 'doSomething( )' (presumably malicious) and subsequently returns a JSON object back to the caller. This has the result of seamlessly injecting arbitrary code execution into the system, without disrupting its normal flow of operation: the recipient of the results of the call to eval will still receive what it expects, a JSON object.

The example code shown above may produce an AST that may be similar to:

```
{"type": "Unit", "body":[{"type": "Block", "body":{"type":     (23)
"CallExpression",
"target":{"type": "FunctionDeclaration", "body":[{"type":
"CallExpression",
"target":{"type": "NameExpression", "value": "doSomething"}},{"type":
"ReturnStatement", "value":{"type": "ObjectExpression",
"members":[{"type": "MemberOperation", "target":{"type":
"StringLiteral",
"value": "a"}, "member":{"type": "NumberLiteral", "value": 1}}]}}]}}]}
```

This example AST is substantially distinct from the first example AST. This AST may also be processed to produce a more stable, variable-insensitive form. If the same heuristics are applied to the object expressions as above, and other heuristics are assumed to remove variability from constructs such as call expressions and function declarations, an expression may be generated that may be similar to:

```
[CallExpression(Function=[CallExpression(doSomething),ReturnStatement
(ObjectExpression(NumberLiteral))]                                (24)
```

This example representation may indicate that a call to an anonymous function has been processed, that itself includes a call to a function named doSomething and a return of an object expression that includes members with numeric literal values only. This example representation is substantially distinct from the stable pattern that may be expected. This example representation also includes indicators of code execution. This example continues to include some identifiers (in this case, the name of a single function, 'doSomething').

These examples are intended to demonstrate techniques for normalizing code representations and producing stable, variable-insensitive forms. These examples may demonstrate that there is substantial flexibility in terms of how the code is represented or what features may be extracted from it. For example, this representation is substantially insensitive to specificity of conformance to any particular language or format.

As discussed herein, both server-side and client-side scenarios may utilize one or more example techniques. For example, techniques discussed herein may be used for database server scenarios, as well as for server-side mark-up construction (e.g., as provided by PHP and ASP.NET applications). For example, on the client, a browser may be modified to apply example techniques to the construction of arbitrary JAVASCRIPT code as well as the insertion of mark-up (rendered as text) into the DOM. Additionally, the responses of client-generated HTTP requests (such as XmlHTTPResponse requests) may also be processed in order to prevent man-in-the-middle/other data tampering issues that compromise the contents of those responses (many of which will be converted directly into DOM elements/JAVASCRIPT code on the client).

Further, example techniques discussed herein may provide an ability to associate filtering/validation artifacts with an identifier as some kind. For example, a URL is an identifier around which it may be possible to organize distinct sets of blocked/approved templates. A source code location (i.e., a specific file name/line number) associated with a call to 'eval' or some other JS dynamic construction API may be used for client-side scenarios. For example, the blocked/approved lists may be refined by examining call stacks leading up to the routine which executes the query/code.

Example techniques discussed may provide an ability to configure the system to adjust its collection/enforcement behavior. For example, the system may be configured in one way during a preliminary testing/general use phase. In this phase, it may be assumed that all execution activity is benign and that all observed code/query templates may automatically be added to associated approved lists. All parsing errors in this phase may be logged in order to drive development fixes. After seeding the approved lists/other supporting metadata with observed data from this use, the system may subsequently be configured for live/untrusted use (which may result in halting of execution on receipt of a parsing error, blocking queries that normalize to a previously unobserved form, etc).

In accordance with example techniques discussed herein, the list 146 may be associated with various different entities. For example, the list 146 may be associated with a single application, or multiple applications. For example, the list 146 may be associated with a single user, or multiple users. For example, the list 146 may be associated with a single device or server, or multiple devices or servers. For example, the list 146 may be associated with a single injection monitor, or multiple injection monitors. For example, there may exist multiple instances of an injection monitor on a server, which may respectively process input based on information passed to the server for determining which of the instances will process particular requests 110. For example, a server may deploy the list 146 to a client. For example, authoritative sources (or entities that serve information for a trusted source) may be used for building and maintaining the lists 146.

One skilled in the art of data processing will appreciate that many different techniques may be used for normalized code validation, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 4A:
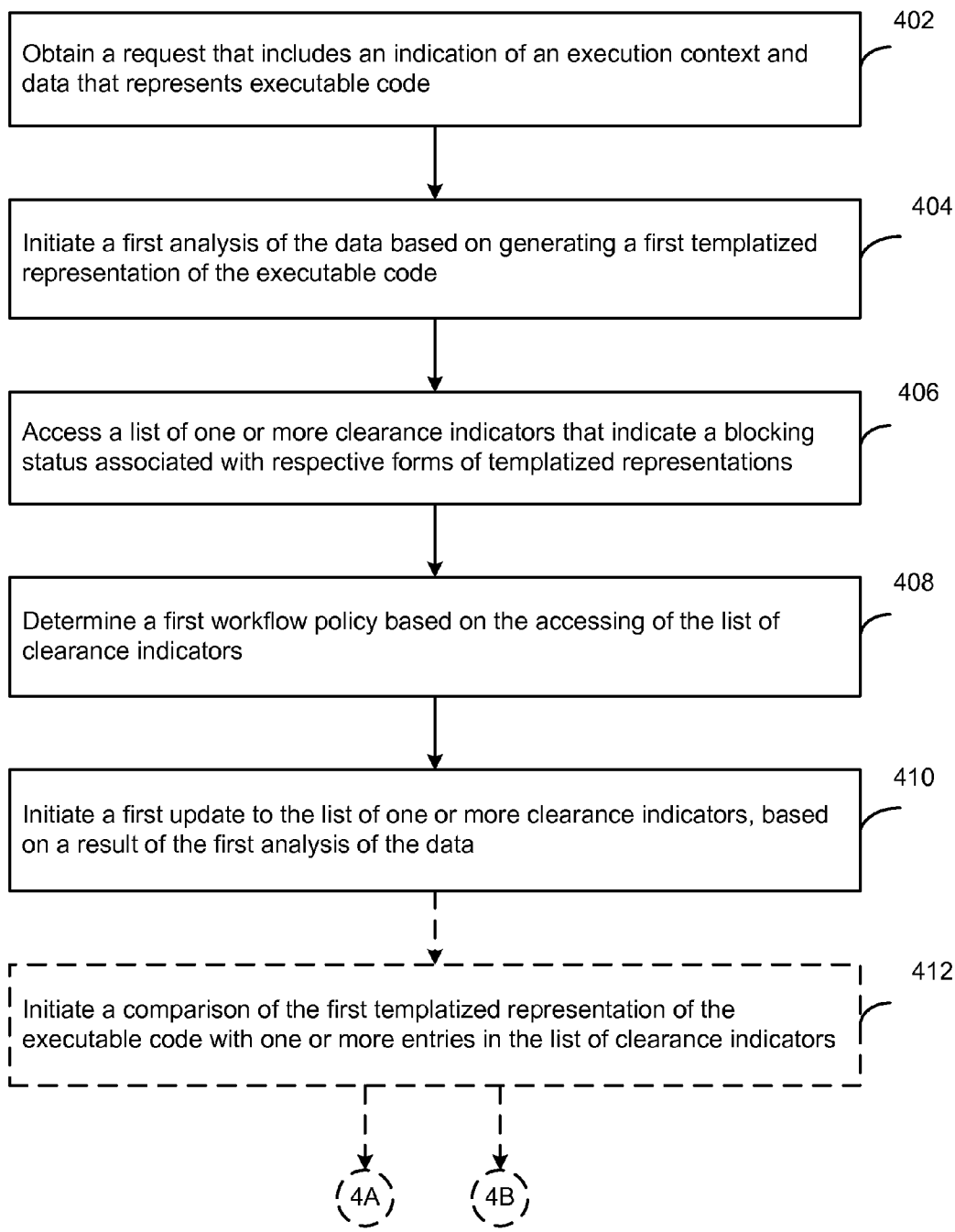
FIGS. 4a-4b are a flowchart illustrating example operations of the system of FIG. 1.

FIG. 4 is a flowchart illustrating example operations of the system of FIG. 1, according to example embodiments. In the example of FIG. 4a, a request that includes an indication of an execution context and data that represents executable code may be obtained (402). For example, the request acquisition component 108 may obtain the request 110 that includes an indication of an execution context 112 and data 114 that represents executable code, as discussed above.

A first analysis of the data may be initiated based on generating a first templatized representation of the executable code (404). For example, the data analysis component 140 may initiate a first analysis of the data 114 based on generating a first templatized representation 142 of the executable code, as discussed above.

A list of one or more clearance indicators may be accessed (406). The clearance indicators may indicate a blocking status associated with respective forms of templatized representations. For example, the list access component 144 may access the list 146 of one or more clearance indicators 148 that indicate a blocking status associated with respective forms of templatized representations 142, as discussed above.

A first workflow policy may be determined based on the accessing of the list of clearance indicators (408). For example, the workflow policy component 150 may determine the first workflow policy 152 based on the accessing of the list 146 of clearance indicators 148, as discussed above.

A first update to the list of one or more clearance indicators may be initiated based on one or more of aggregating at least a portion of the resource files based on the determined one or more runtime environment attributes, or excluding at least a portion of the resource files based on a result of the first analysis of the data (410). For example, the list update component 154 may initiate a first update to the list 146 of one or more clearance indicators 148, based on a result of the first analysis of the data 114, as discussed above.

For example, a comparison of the first templatized representation of the executable code with one or more entries in the list of clearance indicators may be initiated (412). For example, the template comparison component 156 may initiate a comparison of the first templatized representation 142 of the executable code with one or more entries in the list 146 of clearance indicators 148, as discussed above.

Figure 4B:
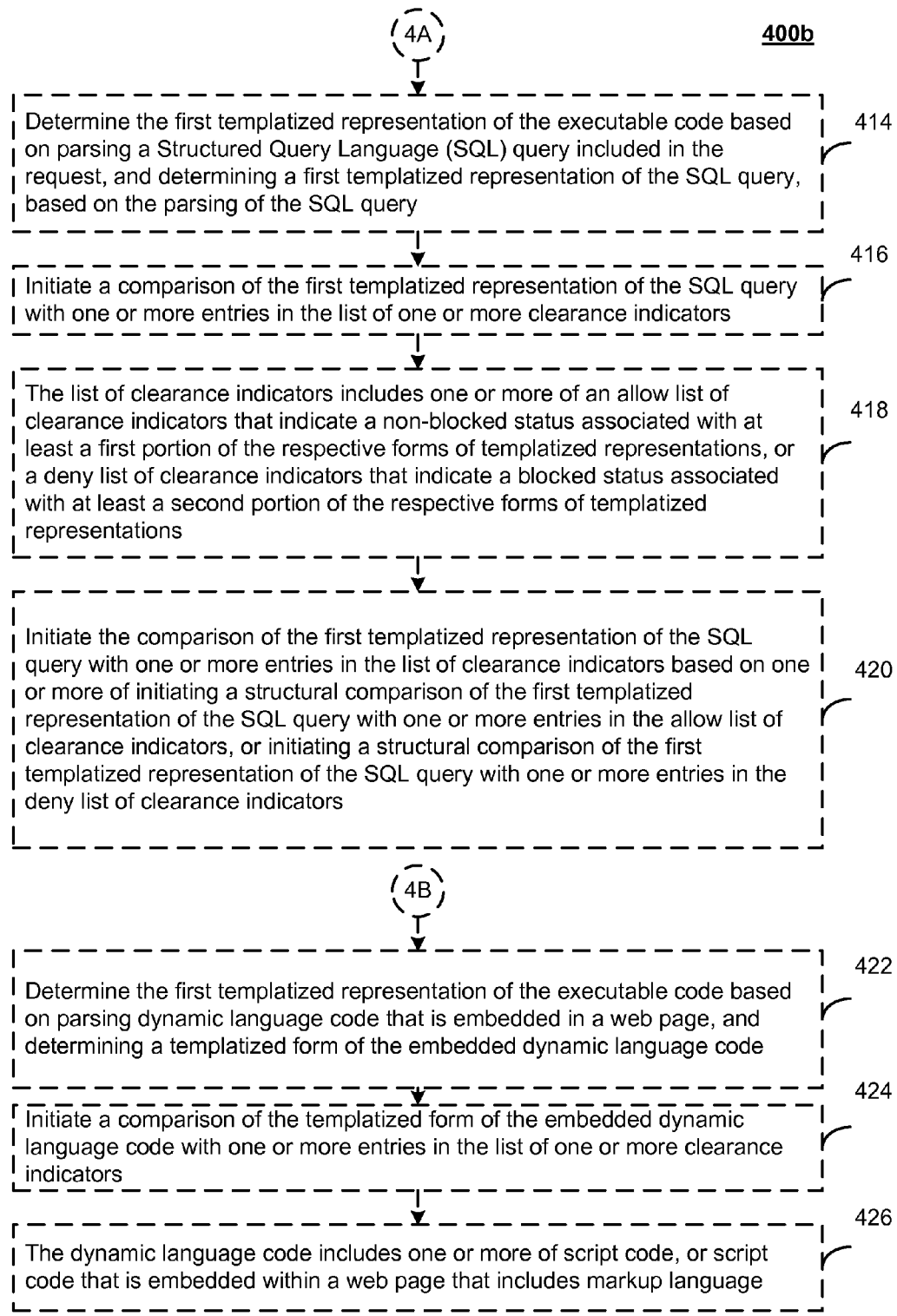

For example, the first templatized representation of the executable code may be determined based on parsing a Structured Query Language (SQL) query included in the request, and determining a first templatized representation of the SQL query, based on the parsing of the SQL query (414), in the example of FIG. 4b. For example, the data analysis component 140 may determine the first templatized representation 142 of the executable code based on parsing a Structured Query Language (SQL) query included in the request 110, and determining a first templatized representation of the SQL query, based on the parsing of the SQL query, as discussed above.

For example, a comparison of the first templatized representation of the SQL query with one or more entries in the list of one or more clearance indicators may be initiated (416). For example, the query comparison component 158 may initiate a comparison of the first templatized representation of the SQL query with one or more entries in the list 146 of one or more clearance indicators 148, as discussed above.

For example, the list of clearance indicators may include one or more of an allow list of clearance indicators that indicate a non-blocked status associated with at least a first portion of the respective forms of templatized representations, or a deny list of clearance indicators that indicate a blocked status associated with at least a second portion of the respective forms of templatized representations (418).

For example, the comparison of the first templatized representation of the SQL query with one or more entries in the list of clearance indicators may be initiated based on one or more of initiating a structural comparison of the first templatized representation of the SQL query with one or more template queries associated with clearance indicators included in the allow list of clearance indicators, or initiating a structural comparison of the first templatized representation of the SQL query with one or more template queries associated with clearance indicators included in the deny list of clearance indicators (420).

For example, the comparison of the first templatized representation of the SQL query with the entries in the list of clearance indicators may be initiated based on initiating a binary string format comparison of the first templatized representation of the SQL query with one or more entries in the allow list of clearance indicators. For example, the comparison of the first templatized representation of the SQL query with the entries in the list of clearance indicators may be initiated based on initiating a token-by-token comparison of a first templatized representation of the SQL query with one or more entries in the deny list of clearance indicators. For example, the query comparison component 158 may initiate the comparison of the first templatized representation of the SQL query with one or more entries in the list 146 of clearance indicators 148 based on one or more of initiating a binary string format comparison of the first templatized representation of the SQL query with one or more entries in the allow list 160 of clearance indicators 148, or initiating a token-by-token comparison of the first templatized representation of the SQL query with one or more entries in the deny list 162 of clearance indicators 148, as discussed above.

For example, in one aspect, "allow list" matching may involve a binary comparison where the templates are compared to determine whether they exactly match, or substantially match. For example, the comparison may further include any type of "string comparison," or other type of comparison to check for equality (or substantial equality. One skilled in the art of data processing will understand that there are many other types of "equality" comparisons that may be used, without departing from the spirit of the discussion herein.

For example, in another aspect, "deny list" matching may involve determining whether there is a change in the structure of the query, after detection of a user controllable parameter.

For example, the first templatized representation of the executable code may be determined based on parsing dynamic language code that is embedded in a web page, and determining a templatized form of the embedded dynamic language code, based on the parsing of the embedded dynamic language code (422). For example, the data analysis component 140 may determine the first templatized representation 142 of the executable code based on parsing dynamic language code that is embedded in a web page, and determining a templatized form of the embedded dynamic language code, based on the parsing of the embedded dynamic language code, as discussed above.

For example, a comparison of the templatized form of the embedded dynamic language code with one or more entries in the list of one or more clearance indicators may be initiated (424). For example, the dynamic language comparison component 164 may initiate a comparison of the templatized form of the embedded dynamic language code with one or more entries in the list 146 of one or more clearance indicators 148, as discussed above.

For example, the dynamic language code includes one or more of script code, or script code that is embedded within a web page that includes markup language (426).

FIG. 5 is a flowchart illustrating example operations of the system of FIG. 1, according to example embodiments. In the example of FIG. 5*a*, a request that includes an indication of an execution context and data that represents executable code may be obtained (502). For example, the request acquisition component 108 may obtain the request 110 that includes an indication of an execution context 112 and data 114 that represents executable code, as discussed above.

A first analysis of the data may be initiated based on generating a first templatized representation of the executable code (504). For example, the data analysis component 140 may initiate a first analysis of the data 114 based on generating a first templatized representation 142 of the executable code, as discussed above.

A list of one or more clearance indicators that indicate a blocking status associated with respective forms of templatized representations may be accessed (506). For example, the list access component 144 may access the list 146 of one or more clearance indicators 148 that indicate a blocking status associated with respective forms of templatized representations 142, as discussed above.

A first workflow policy may be determined, based on the accessing of the list of clearance indicators (508). For example, the workflow policy component 150 may determine the first workflow policy 152 based on the accessing of the list 146 of clearance indicators 148, as discussed above.

A first update to the list of one or more clearance indicators may be initiated, based on a result of the first analysis of the data (510). For example, the list update component 154 may initiate a first update to the list 146 of one or more clearance indicators 148, based on a result of the first analysis of the data 114, as discussed above.

For example, the first analysis may be performed on a client device, or the first analysis may be performed on a server (512).

Figure 5A:
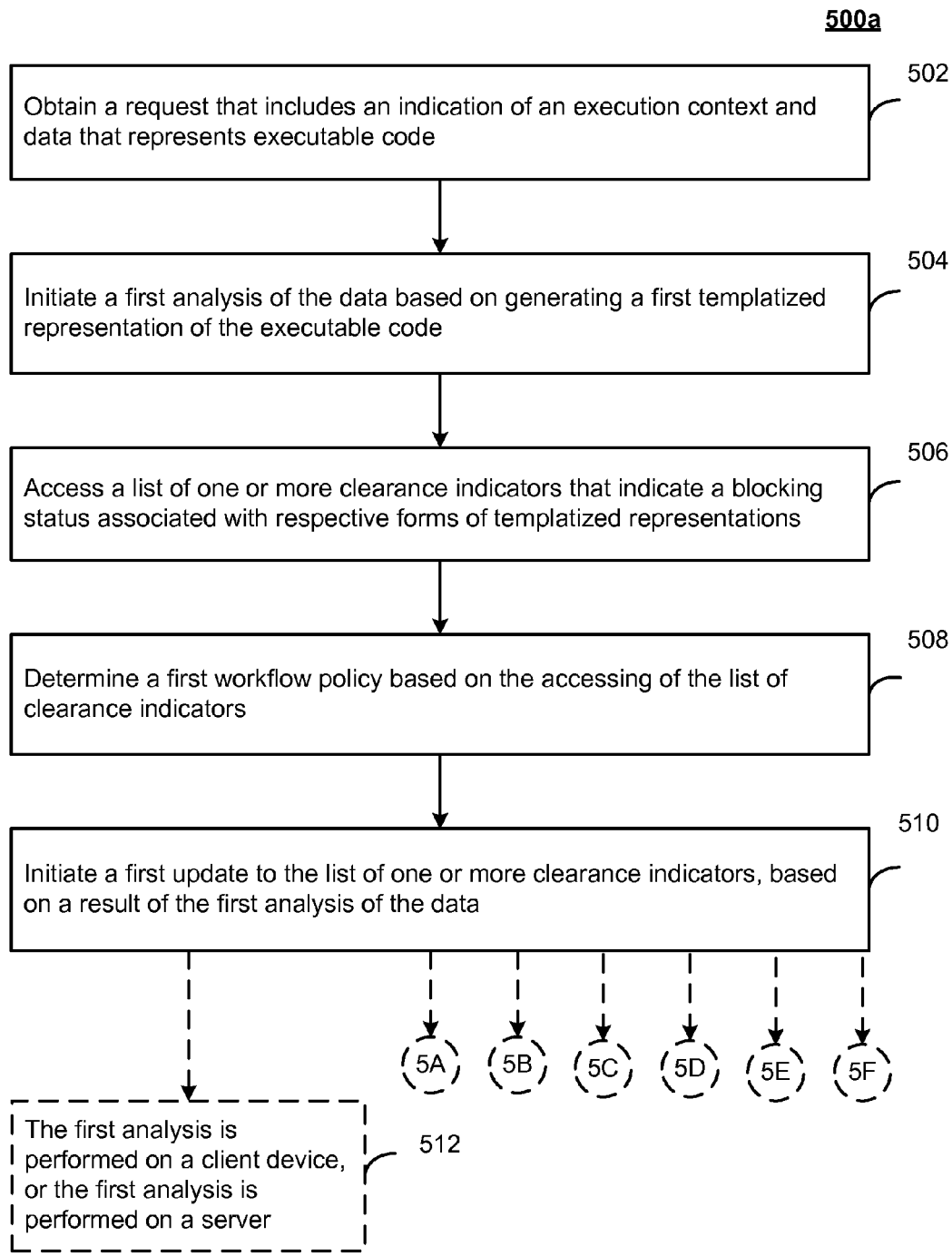
FIGS. 5a-5e are a flowchart illustrating example operations of the system of FIG. 1.
Figure 5B:
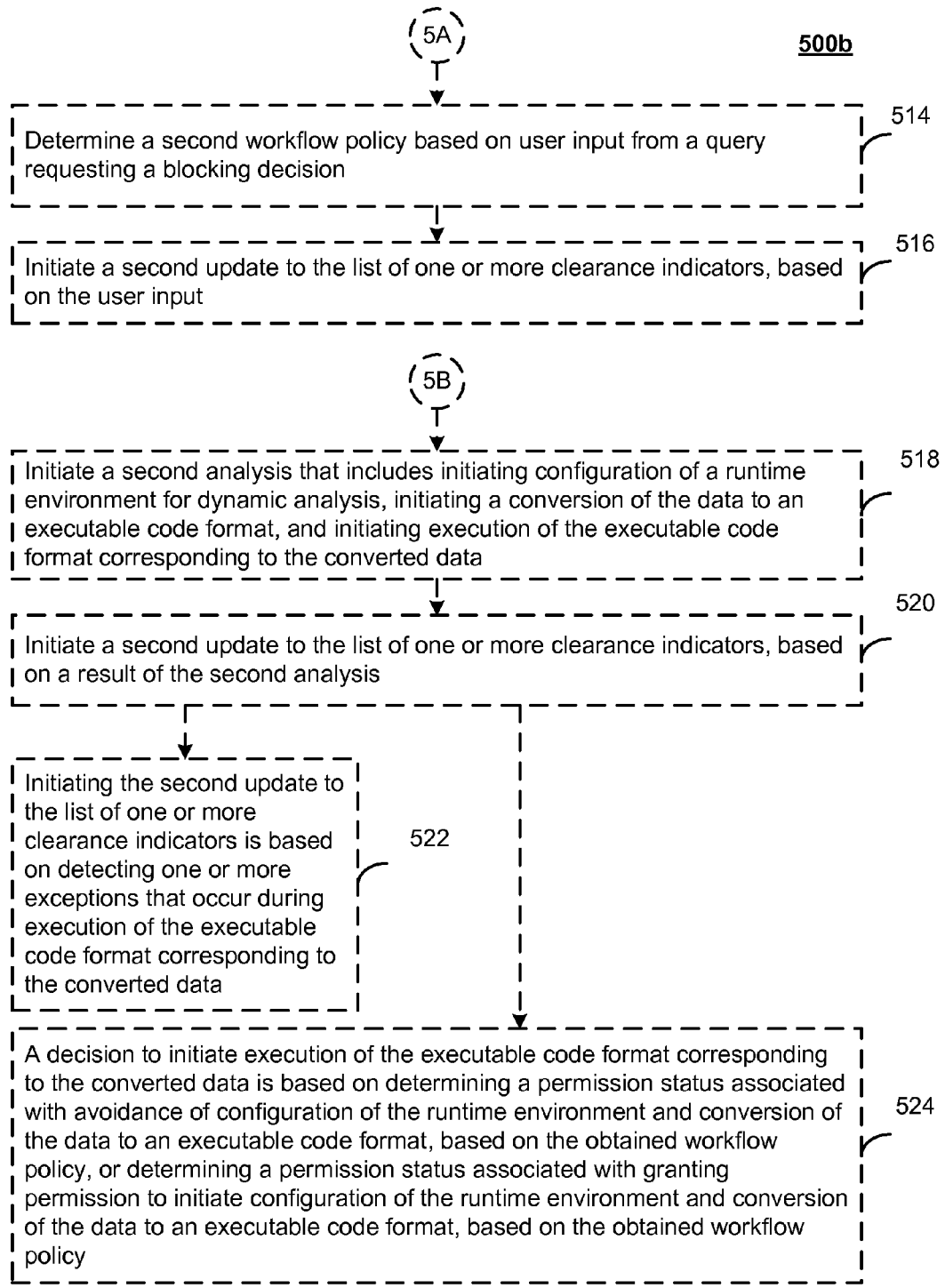

For example, a second workflow policy may be determined based on user input from a query requesting a blocking decision (514), in the example of FIG. 5*b*.

For example, a second update to the list of one or more clearance indicators may be initiated, based on the user input (516).

For example, a second analysis may be initiated that includes initiating configuration of a runtime environment for dynamic analysis, initiating a conversion of the data to an executable code format, and initiating execution of the executable code format corresponding to the converted data (518).

For example, a second update to the list of one or more clearance indicators may be initiated, based on a result of the second analysis (520).

For example, initiating the second update to the list of one or more clearance indicators may be based on detecting one or more exceptions that occur during execution of the executable code format corresponding to the converted data (522).

For example, a decision to initiate execution of the executable code format corresponding to the converted data may be based on determining a permission status associated with avoidance of configuration of the runtime environment and conversion of the data to an executable code format, based on the obtained workflow policy, or determining a permission status associated with granting permission to initiate configuration of the runtime environment and conversion of the data to an executable code format, based on the obtained workflow policy (524).

Figure 5C:
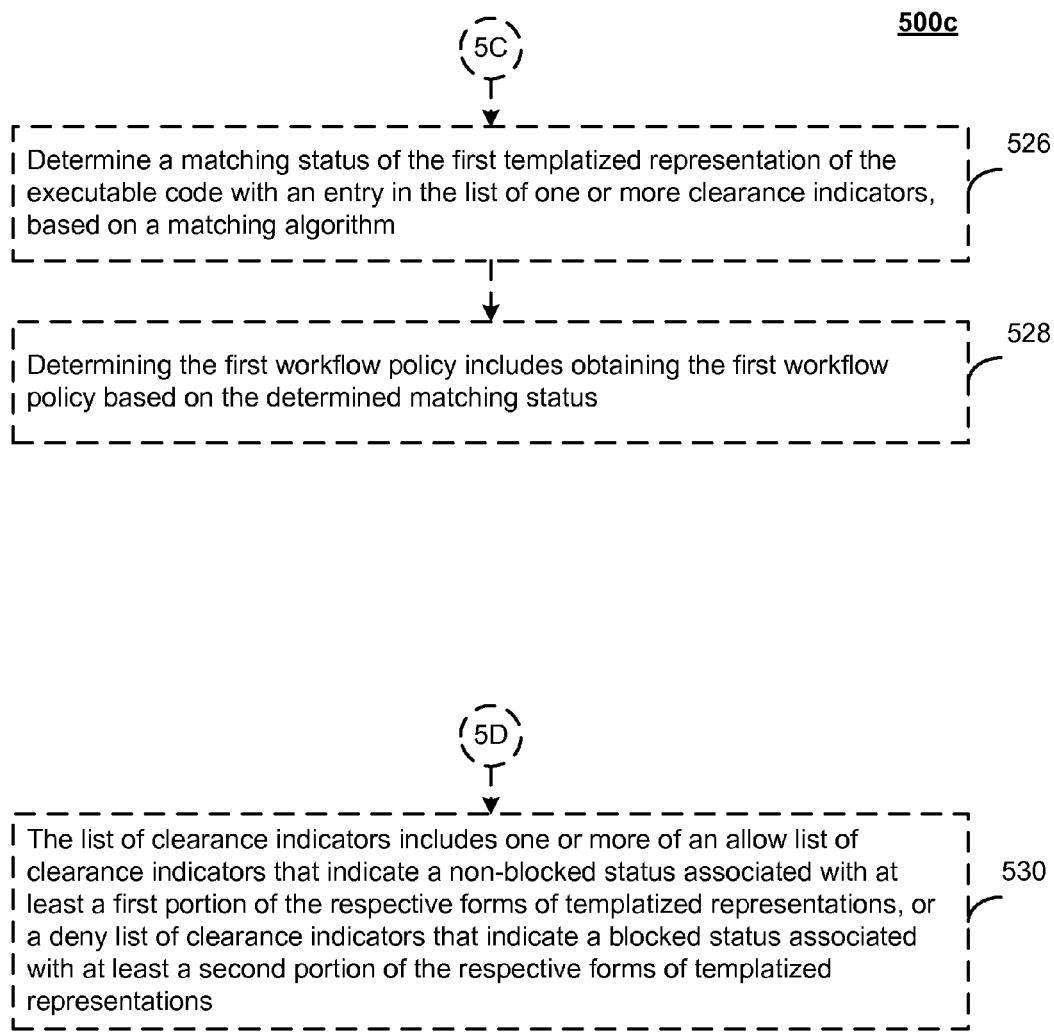

For example, a matching status of the first templatized representation of the executable code with an entry in the list of one or more clearance indicators may be determined, based on a matching algorithm (526), in the example of FIG. 5*c*.

For example, determining the first workflow policy may include obtaining the first workflow policy based on the determined matching status (528).

For example, the list of clearance indicators may include one or more of an allow list of clearance indicators that indicate a non-blocked status associated with at least a first portion of the respective forms of templatized representations, or a deny list of clearance indicators that indicate a blocked status associated with at least a second portion of the respective forms of templatized representations (530).

Figure 5D:
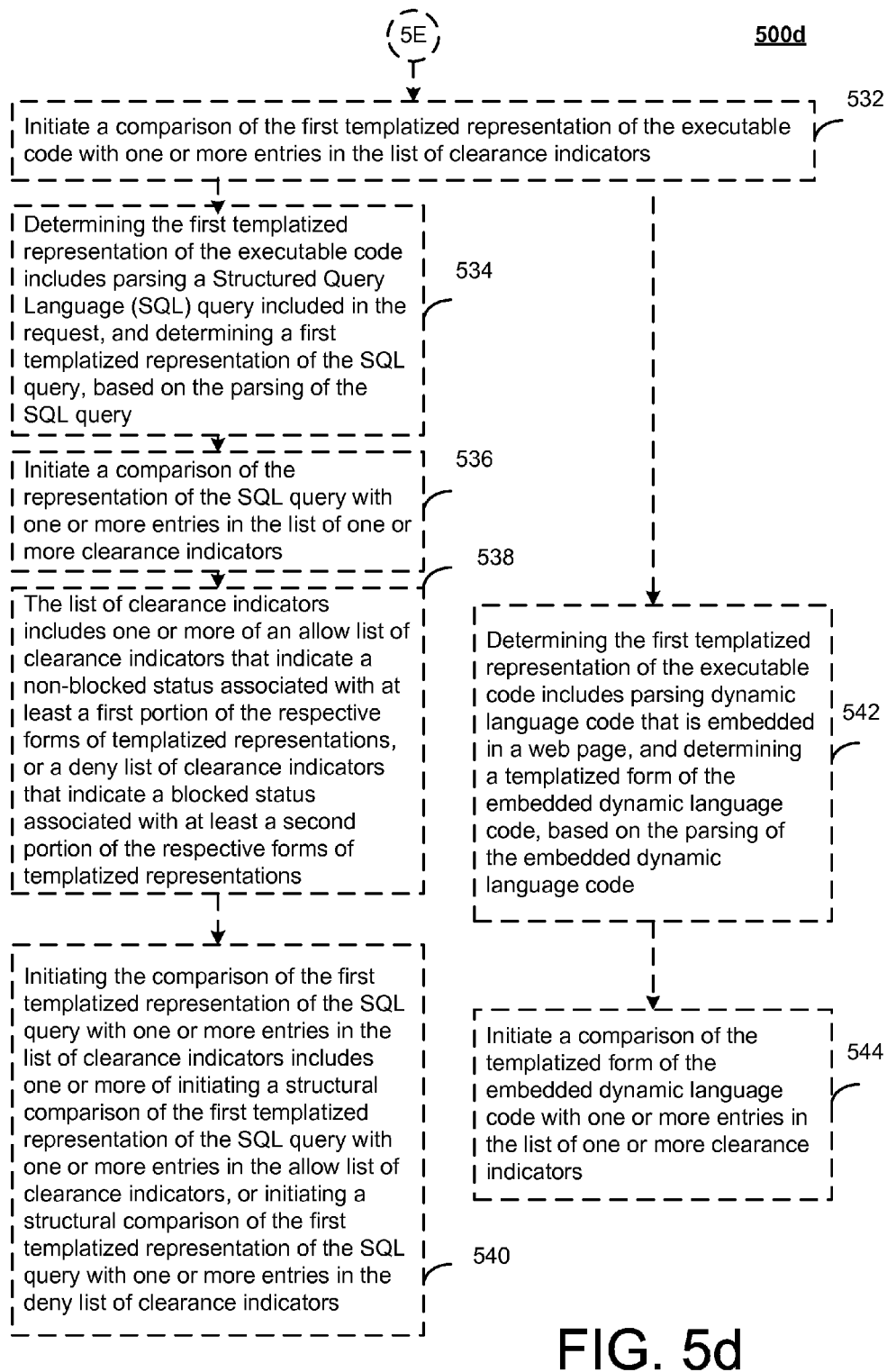

For example, a comparison of the first templatized representation of the executable code with one or more entries in the list of clearance indicators may be initiated (532), in the example of FIG. 5*d*.

For example, determining the first templatized representation of the executable code may include parsing a Structured Query Language (SQL) query included in the request, and determining a first templatized representation of the SQL query, based on the parsing of the SQL query (534).

For example, a comparison of the first templatized representation of the SQL query with one or more entries in the list of one or more clearance indicators may be initiated (536).

For example, the list of clearance indicators may include one or more of an allow list of clearance indicators that indicate a non-blocked status associated with at least a first portion of the respective forms of templatized representations, or a deny list of clearance indicators that indicate a blocked status associated with at least a second portion of the respective forms of templatized representations (538).

For example, initiating the comparison of the first templatized representation of the SQL query with one or more entries in the list of clearance indicators may include one or more of initiating a structural comparison of the first templatized representation of the SQL query with one or more template queries associated with clearance indicators included in the allow list of clearance indicators, or initiating a structural comparison of the first templatized representation of the SQL query with one or more template queries associated with clearance indicators included in the deny list of clearance indicators (540).

For example, initiating the comparison of the first templatized representation of the SQL query with the entries in the list of clearance indicators may include initiating a binary string format comparison of the first templatized representation of the SQL query with one or more entries in the allow list of clearance indicators. For example, initiating the comparison of the first templatized representation of the SQL query with the entries in the list of clearance indicators may include initiating a token-by-token comparison of a first templatized representation of the SQL query with one or more entries in the deny list of clearance indicators.

For example, determining the first templatized representation of the executable code may include parsing dynamic language code that is embedded in a web page, and determining a templatized form of the embedded dynamic language code (542).

For example, a comparison of the templatized form of the embedded dynamic language code with one or more entries in the list of one or more clearance indicators may be initiated (544).

Figure 5E:
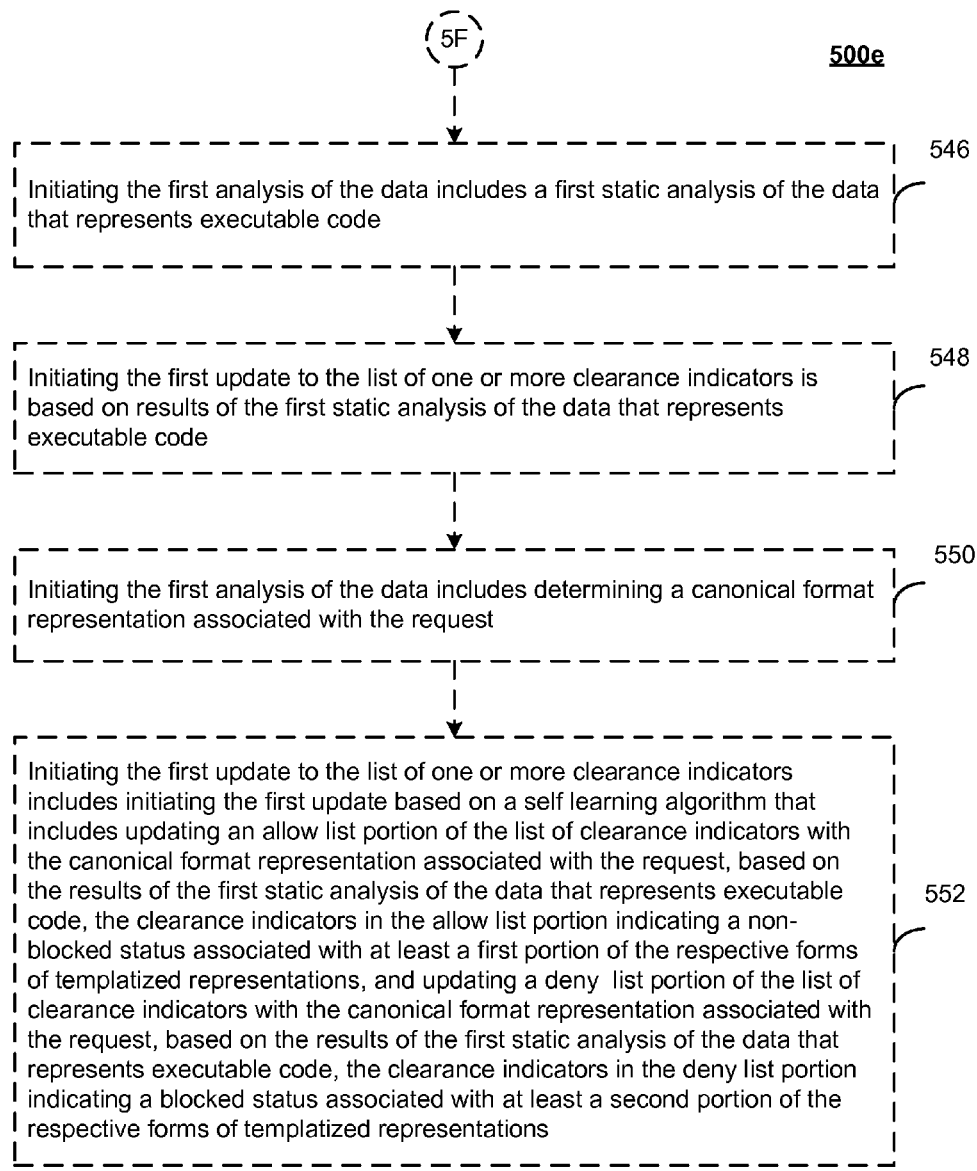

For example, initiating the first analysis of the data may include a first static analysis of the data that represents executable code (546), in the example of FIG. 5*e*. For example, a detection or observation of parsing errors, inline comments, or multi-statement batches (or other observations) may be determined as a basis for updating the list (e.g., as potential SQL Injection attempts).

For example, initiating the first update to the list of one or more clearance indicators may be based on results of the first static analysis of the data that represents executable code (548).

For example, initiating the first analysis of the data may include determining a canonical format representation associated with the request (550). For example, initiating the first update to the list of one or more clearance indicators may include initiating the first update based on a self learning algorithm that includes updating an allow list portion of the list of clearance indicators with the canonical format representation associated with the request, based on the results of the first static analysis of the data that represents executable code, the clearance indicators in the allow list portion indicating a non-blocked status associated with at least a first portion of the respective forms of templatized representations, and updating a deny list portion of the list of clearance indicators with the canonical format representation associated with the request, based on the results of the first static analysis of the data that represents executable code, the clearance indicators in the deny list portion indicating a blocked status associated with at least a second portion of the respective forms of templatized representations (552).

Figure 6:
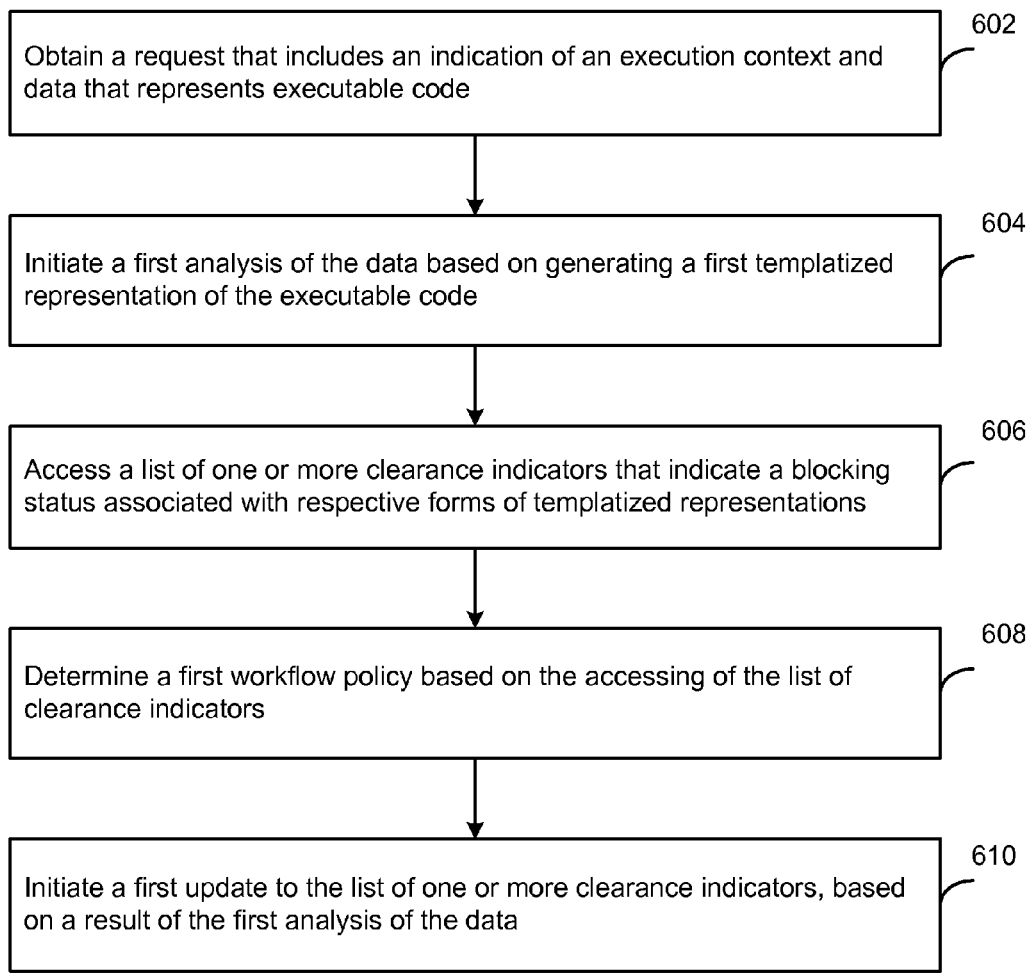
FIG. 6 is a flowchart illustrating example operations of the system of FIG. 1.

FIG. 6 is a flowchart illustrating example operations of the system of FIG. 1, according to example embodiments. In the example of FIG. 6, a request may be obtained (602). The request may include an indication of an execution context and data that represents executable code. For example, the request acquisition component 108 may obtain the request 110 that includes an indication of an execution context 112 and data 114 that represents executable code, as discussed above.

A first analysis of the data may be initiated based on generating a first templatized representation of the executable code (604). For example, the data analysis component 140 may initiate a first analysis of the data 114 based on generating a first templatized representation 142 of the executable code, as discussed above.

A list of one or more clearance indicators that indicate a blocking status associated with respective forms of templatized representations may be accessed (606). For example, the list access component 144 may access the list 146 of one or more clearance indicators 148 that indicate a blocking status associated with respective forms of templatized representations 142, as discussed above.

A first workflow policy may be determined based on the accessing of the list of clearance indicators (608). For example, the workflow policy component 150 may determine the first workflow policy 152 based on the accessing of the list 146 of clearance indicators 148, as discussed above.

A first update to the list of one or more clearance indicators may be initiated, based on a result of the first analysis of the data (610). For example, the list update component 154 may initiate a first update to the list 146 of one or more clearance indicators 148, based on a result of the first analysis of the data 114, as discussed above.

One skilled in the art of data processing will understand that there may be many ways of validating normalized code representations, without departing from the spirit of the discussion herein.

Customer privacy and confidentiality have been ongoing considerations in data processing environments for many years. Thus, example techniques for validating code may use user input and/or data provided by users who have provided permission via one or more subscription agreements (e.g., "Terms of Service" (TOS) agreements) with associated applications or services associated with such validation. For example, users may provide consent to have their input/data transmitted and stored on devices, though it may be explicitly indicated (e.g., via a user accepted agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a device that includes at least one processor, and a computer readable storage medium storing instructions for execution by one or more of the at least one processor, for implementing a code validation engine that includes:
a request acquisition component that obtains a request that includes an indication of an execution context and data that represents executable code, the execution context including descriptive information for identification of a source of the request;
a data analysis component that initiates a first analysis of the data based on generating a first templatized representation of the executable code;
a list access component that accesses a list of one or more clearance indicators that indicate a blocking status associated with respective forms of templatized representations;
a workflow policy component that determines a first workflow policy based on the accessing of the list of clearance indicators; and
a list update component that initiates a first update to the list of one or more clearance indicators, based on a result of the first analysis of the data, and based on a result of obtaining a count of a number of occurrences of determinations of unacceptability associated with other requests previously obtained from the source of the request, based on the descriptive information in the execution context,
the one or more of the at least one processor initiating control of execution of the executable code represented by the data, in accordance with a result of the accessing the list of one or more clearance indicators.

2. The system of claim 1, further comprising:
a template comparison component that initiates a comparison of the first templatized representation of the executable code with one or more entries in the list of clearance indicators.

3. The system of claim 2, wherein:
the data analysis component determines the first templatized representation of the executable code based on parsing a Structured Query Language (SQL) query included in the request, and determining a first templatized representation of the SQL query, based on the parsing of the SQL query, wherein
the system further includes a query comparison component that initiates a comparison of the first templatized representation of the SQL query with one or more entries in the list of one or more clearance indicators, wherein
the list of clearance indicators includes one or more of:

an allow list of clearance indicators that indicate a non-blocked status associated with at least a first portion of the respective forms of templatized representations, or a deny list of clearance indicators that indicate a blocked status associated with at least a second portion of the respective forms of templatized representations, wherein the query comparison component is configured to initiate the comparison of the first templatized representation of the SQL query with one or more entries in the list of clearance indicators based on one or more of:

initiating a structural comparison of the first templatized representation of the SQL query with one or more entries in the allow list of clearance indicators, or initiating a structural comparison of the first templatized representation of the SQL query with one or more entries in the deny list of clearance indicators.

4. The system of claim 2, wherein:

the data analysis component determines the first templatized representation of the executable code based on parsing dynamic language code that is embedded in a web page, and determining a templatized form of the embedded dynamic language code, wherein the system further includes a dynamic language comparison component that initiates a comparison of the templatized form of the embedded dynamic language code with one or more entries in the list of one or more clearance indicators.

5. The system of claim 4, wherein:

the dynamic language code includes one or more of:

script code, or script code that is embedded within a web page that includes markup language.

6. A method comprising:

obtaining a request that includes an indication of an execution context and data that represents executable code, the execution context including descriptive information for identification of a source of the request;

initiating a first analysis of the data based on generating a first templatized representation of the executable code;

accessing a list of one or more clearance indicators that indicate a blocking status associated with respective forms of templatized representations;

determining a first workflow policy based on the accessing of the list of clearance indicators;

initiating a first update to the list of one or more clearance indicators, based on a result of the first analysis of the data, and based on a result of obtaining a determination of a level of unacceptability associated with other requests previously obtained from the specific source of the request, based on the descriptive information in the execution context; and initiating control of execution of the executable code represented by the data, in accordance with a result of the accessing the list of one or more clearance indicators.

7. The method of claim 6, wherein:

the first analysis is performed on a client device, or the first analysis is performed on a server.

8. The method of claim 6, further comprising:

determining a second workflow policy based on user input from a query requesting a blocking decision; and initiating a second update to the list of one or more clearance indicators, based on the user input.

9. The method of claim 6, further comprising:

initiating a second analysis that includes:

initiating configuration of a runtime environment for dynamic analysis, initiating a conversion of the data to an executable code format, and initiating execution of the executable code format corresponding to the converted data; and initiating a second update to the list of one or more clearance indicators, based on a result of the second analysis.

10. The method of claim 9, wherein:

initiating the second update to the list of one or more clearance indicators is based on detecting one or more exceptions that occur during execution of the executable code format corresponding to the converted data.

11. The method of claim 9, wherein:

a decision to initiate execution of the executable code format corresponding to the converted data is based on:

determining a permission status associated with avoidance of configuration of the runtime environment and conversion of the data to an executable code format, based on the obtained workflow policy, or determining a permission status associated with granting permission to initiate configuration of the runtime environment and conversion of the data to an executable code format, based on the obtained workflow policy.

12. The method of claim 6, further comprising:

determining a matching status of the first templatized representation of the executable code with an entry in the list of one or more clearance indicators, based on a matching algorithm, wherein determining the first workflow policy includes obtaining the first workflow policy based on the determined matching status.

13. The method of claim 6, wherein:

the list of clearance indicators includes one or more of:

an allow list of clearance indicators that indicate a non-blocked status associated with at least a first portion of the respective forms of templatized representations, or a deny list of clearance indicators that indicate a blocked status associated with at least a second portion of the respective forms of templatized representations.

14. The method of claim 6, further comprising:

initiating a comparison of the first templatized representation of the executable code with one or more entries in the list of clearance indicators.

15. The method of claim 14, wherein:

determining the first templatized representation of the executable code includes parsing a Structured Query Language (SQL) query included in the request, and determining a first templatized representation of the SQL query, based on the parsing of the SQL query, wherein the method further includes initiating a comparison of the first templatized representation of the SQL query with one or more entries in the list of one or more clearance indicators.

16. The method of claim 15, wherein:

the list of clearance indicators includes one or more of:

an allow list of clearance indicators that indicate a non-blocked status associated with at least a first portion of the respective forms of templatized representations, or a deny list of clearance indicators that indicate a blocked status associated with at least a second portion of the respective forms of templatized representations, wherein initiating the comparison of the first templatized representation of the SQL query with one or more entries in the list of clearance indicators includes one or more of:
- initiating a structural comparison of the first templatized representation of the SQL query with one or more entries in the allow list of clearance indicators, or
- initiating a structural comparison of the first templatized representation of the SQL query with one or more entries in the deny list of clearance indicators.

17. The method of claim 14, wherein:
determining the first templatized representation of the executable code includes parsing dynamic language code that is embedded in a web page, and determining a templatized form of the embedded dynamic language code, wherein
the method further includes initiating a comparison of the templatized form of the embedded dynamic language code with one or more entries in the list of one or more clearance indicators.

18. The method of claim 6, wherein:
initiating the first analysis of the data includes a first static analysis of the data that represents executable code, wherein
initiating the first update to the list of one or more clearance indicators is based on results of the first static analysis of the data that represents executable code.

19. The method of claim 18, wherein:
initiating the first analysis of the data includes determining a canonical format representation associated with the request, wherein
initiating the first update to the list of one or more clearance indicators includes initiating the first update based on a self learning algorithm that includes:
- updating an allow list portion of the list of clearance indicators with the canonical format representation associated with the request, based on the results of the first static analysis of the data that represents executable code, the clearance indicators in the allow list portion indicating a non-blocked status associated with at least a first portion of the respective forms of templatized representations, and
- updating a deny list portion of the list of clearance indicators with the canonical format representation associated with the request, based on the results of the first static analysis of the data that represents executable code, the clearance indicators in the deny list portion indicating a blocked status associated with at least a second portion of the respective forms of templatized representations.

20. A computer program product comprising a computer-readable storage medium storing executable code that causes at least one data processing apparatus to:
obtain a request that includes an indication of an execution context and data that represents executable code, the execution context including descriptive information for identification of a source of the request;
initiate a first analysis of the data based on generating a first templatized representation of the executable code;
access a list of one or more clearance indicators that indicate a blocking status associated with respective forms of templatized representations;
determine a first workflow policy based on the accessing of the list of clearance indicators; and
initiate a first update to the list of one or more clearance indicators, based on a result of the first analysis of the data, and based on a frequency of other requests previously obtained from the source of the request, based on the descriptive information in the execution context; and
initiate control of execution of the executable code represented by the data, in accordance with a result of the accessing the list of one or more clearance indicators.

* * * * *